(12) United States Patent
Maheshwari

(10) Patent No.: US 6,987,600 B1
(45) Date of Patent: Jan. 17, 2006

(54) ARBITRARY PHASE PROFILE FOR BETTER EQUALIZATION IN DYNAMIC GAIN EQUALIZER

(75) Inventor: Dinesh Maheshwari, Fremont, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 220 days.

(21) Appl. No.: 10/322,213

(22) Filed: Dec. 17, 2002

(51) Int. Cl.
G02B 26/00 (2006.01)

(52) U.S. Cl. .................. 359/291; 359/290; 359/124; 385/129; 385/19

(58) Field of Classification Search ............ 359/290, 359/291, 124, 127, 130, 237; 385/129, 39, 385/19, 31, 37
See application file for complete search history.

(56) References Cited

U.S. PATENT DOCUMENTS

| | | | |
|---|---|---|---|
| 1,525,550 A | | 2/1925 | Jenkins |
| 1,548,262 A | | 8/1925 | Freedman |
| RE16,767 E | | 10/1927 | Jenkins |
| 1,814,701 A | | 7/1931 | Ives |
| 2,415,226 A | | 2/1947 | Sziklai ................ 178/5.4 |
| 2,783,406 A | | 2/1957 | Vanderhooft ............ 313/70 |
| 2,920,529 A | | 1/1960 | Blythe .................. 88/73 |
| 2,991,690 A | | 7/1961 | Grey et al. ............ 88/16.6 |
| RE25,169 E | | 5/1962 | Glenn |
| 3,256,465 A | | 6/1966 | Weissenstern et al. ..... 317/101 |
| 3,388,301 A | | 6/1968 | James ................. 317/234 |
| 3,443,871 A | | 5/1969 | Chitayat ............... 356/106 |
| 3,553,364 A | * | 1/1971 | Lee ..................... 178/7.3 |
| 3,576,394 A | * | 4/1971 | Lee ..................... 178/7.3 |
| 3,600,798 A | * | 8/1971 | Lee ..................... 29/592 |
| 3,656,837 A | * | 4/1972 | Sandbank ............... 350/161 |
| 3,657,610 A | * | 4/1972 | Yamamoto et al. ........ 317/243 |
| 3,693,239 A | * | 9/1972 | Dix .................... 29/470 |
| 3,743,507 A | * | 7/1973 | Ih et al. ............... 96/81 |
| 3,752,563 A | * | 8/1973 | Torok et al. ........... 350/151 |
| 3,781,465 A | * | 12/1973 | Ernstoff et al. ........ 178/5.4 BD |
| 3,783,184 A | * | 1/1974 | Ernstoff et al. ........ 178/5.4 BD |

(Continued)

FOREIGN PATENT DOCUMENTS

| | | |
|---|---|---|
| DE | 32 33 195 A1 | 3/1983 |
| DE | 43 23 799 A1 | 1/1994 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

Primary Examiner—Ricky Mack
Assistant Examiner—Brandi N Thomas
(74) Attorney, Agent, or Firm—Okamoto & Benedicto LLP

(57) ABSTRACT

A device for selectively adjusting power levels of component signals of a wavelength division multiplexed signal including a first wavelength signal and a second wavelength signal. The device includes a light modulator comprising a plurality of elements. The plurality of elements are configured to form an arbitrary phase profile. The plurality of elements includes a first group of elements configured to receive the first wavelength signal and a second group of elements configured to receive the second wavelength signal. The first group of elements and the second group of elements include at least one common element. Each element is controllable such that each group of elements directs a selected portion of a corresponding received wavelength signal in a first mode. Each first mode is collected such that a power level of each wavelength signal is selectively adjusted.

19 Claims, 4 Drawing Sheets

U.S. PATENT DOCUMENTS

| | | | | |
|---|---|---|---|---|
| 3,792,916 A | * | 2/1974 | Sarna | 350/163 |
| 3,802,769 A | * | 4/1974 | Rotz et al. | 352/43 |
| 3,811,186 A | * | 5/1974 | Larnerd et al. | 29/626 |
| 3,861,784 A | * | 1/1975 | Torok | 350/162 R |
| 3,862,360 A | * | 1/1975 | Dill et al. | 178/7.3 D |
| 3,871,014 A | * | 3/1975 | King et al. | 357/67 |
| 3,886,310 A | * | 5/1975 | Guldberg et al. | 178/7.5 D |
| 3,896,338 A | * | 7/1975 | Nathanson et al. | 315/373 |
| 3,915,548 A | * | 10/1975 | Opittek | 350/3.5 |
| 3,935,499 A | * | 1/1976 | Oess | 313/413 |
| 3,935,500 A | * | 1/1976 | Oess et al. | 313/495 |
| 3,938,881 A | * | 2/1976 | Biegelsen et al. | 350/161 |
| 3,941,456 A | * | 3/1976 | Schilz et al. | 350/161 |
| 3,942,245 A | * | 3/1976 | Jackson et al. | 29/591 |
| 3,943,281 A | * | 3/1976 | Keller et al. | 178/7.5 D |
| 3,947,105 A | * | 3/1976 | Smith | 353/121 |
| 3,969,611 A | * | 7/1976 | Fonteneau | 219/502 |
| 3,980,476 A | * | 9/1976 | Wysocki | 96/1.1 |
| 3,991,416 A | * | 11/1976 | Byles et al. | 340/324 R |
| 4,001,663 A | * | 1/1977 | Bray | 321/2 |
| 4,004,849 A | * | 1/1977 | Shattuck | 350/160 R |
| 4,006,968 A | * | 2/1977 | Ernstoff et al. | 350/160 LC |
| 4,009,939 A | * | 3/1977 | Okano | 350/162 SF |
| 4,011,009 A | * | 3/1977 | Lama et al. | 350/162 R |
| 4,012,116 A | * | 3/1977 | Yevick | 350/132 |
| 4,012,835 A | * | 3/1977 | Wallick | 29/591 |
| 4,017,158 A | | 4/1977 | Booth | 350/162 SF |
| 4,020,381 A | | 4/1977 | Oess et al. | 313/302 |
| 4,021,766 A | | 5/1977 | Aine | 338/2 |
| 4,034,211 A | | 7/1977 | Horst et al. | 235/61.12 N |
| 4,034,399 A | | 7/1977 | Drukier et al. | 357/68 |
| 4,035,068 A | | 7/1977 | Rawson | 353/122 |
| 4,067,129 A | | 1/1978 | Abramson et al. | 40/563 |
| 4,084,437 A | | 4/1978 | Finnegan | 73/361 |
| 4,090,219 A | | 5/1978 | Ernstoff et al. | 358/59 |
| 4,093,346 A | | 6/1978 | Nishino et al. | 350/162 SF |
| 4,093,921 A | | 6/1978 | Buss | 325/459 |
| 4,093,922 A | | 6/1978 | Buss | 325/459 |
| 4,100,579 A | | 7/1978 | Ernstoff | 358/230 |
| 4,103,273 A | | 7/1978 | Keller | 338/2 |
| 4,126,380 A | | 11/1978 | Borm | 350/266 |
| 4,127,322 A | | 11/1978 | Jacobson et al. | 353/31 |
| 4,135,502 A | | 1/1979 | Peck | 128/76.5 |
| 4,139,257 A | | 2/1979 | Matsumoto | 350/6.1 |
| 4,143,943 A | | 3/1979 | Rawson | 350/120 |
| 4,163,570 A | | 8/1979 | Greenaway | 283/8 A |
| 4,184,700 A | | 1/1980 | Greenaway | 283/6 |
| 4,185,891 A | | 1/1980 | Kaestner | 350/167 |
| 4,190,855 A | | 2/1980 | Inoue | 357/80 |
| 4,195,915 A | | 4/1980 | Lichty et al. | 350/345 |
| 4,205,428 A | | 6/1980 | Ernstoff et al. | 29/592 R |
| 4,211,918 A | | 7/1980 | Nyfeler et al. | 235/454 |
| 4,223,050 A | | 9/1980 | Nyfeler et al. | 427/163 |
| 4,225,913 A | | 9/1980 | Bray | 363/97 |
| 4,249,796 A | | 2/1981 | Sincerbox et al. | 350/370 |
| 4,250,217 A | | 2/1981 | Greenaway | 428/161 |
| 4,250,393 A | | 2/1981 | Greenaway | 250/566 |
| 4,256,787 A | | 3/1981 | Shaver et al. | 428/1 |
| 4,257,016 A | | 3/1981 | Kramer, Jr. et al. | 322/7.51 |
| 4,257,053 A | | 3/1981 | Gilbreath | |
| 4,290,672 A | | 9/1981 | Whitefield | 350/358 |
| 4,295,145 A | | 10/1981 | Latta | 346/108 |
| 4,311,999 A | | 1/1982 | Upton et al. | 340/755 |
| 4,327,411 A | | 4/1982 | Turner | 364/900 |
| 4,327,966 A | | 5/1982 | Bloom | 350/162 R |
| 4,331,972 A | | 5/1982 | Rajchman | 358/60 |
| 4,336,982 A | | 6/1982 | Rector, Jr. | 350/358 |
| 4,338,660 A | | 7/1982 | Kelley et al. | 364/200 |
| 4,343,535 A | | 8/1982 | Bleha, Jr. | 350/342 |
| 4,346,965 A | | 8/1982 | Sprague et al. | 350/358 |
| 4,348,079 A | | 9/1982 | Johnson | 350/358 |
| 4,355,463 A | | 10/1982 | Burns | 29/827 |
| 4,361,384 A | | 11/1982 | Bosserman | 350/174 |
| 4,369,524 A | | 1/1983 | Rawson et al. | 455/606 |
| 4,374,397 A | | 2/1983 | Mir | 358/75 |
| 4,389,096 A | | 6/1983 | Hori et al. | 350/339 R |
| 4,391,490 A | | 7/1983 | Hartke | 350/356 |
| 4,396,246 A | | 8/1983 | Holman | 350/96.14 |
| 4,398,798 A | | 8/1983 | Krawczak et al. | 350/162.24 |
| 4,400,740 A | | 8/1983 | Traino et al. | 358/293 |
| 4,408,884 A | | 10/1983 | Kleinknecht et al. | 356/355 |
| 4,414,583 A | | 11/1983 | Hooker, III | 358/300 |
| 4,417,386 A | | 11/1983 | Exner | 29/590 |
| 4,418,397 A | | 11/1983 | Brantingham et al. | 364/900 |
| 4,420,717 A | | 12/1983 | Wallace et al. | 318/696 |
| 4,422,099 A | | 12/1983 | Wolfe | 358/293 |
| 4,426,768 A | | 1/1984 | Black et al. | 29/583 |
| 4,430,584 A | | 2/1984 | Someshwar et al. | 307/465 |
| 4,435,041 A | | 3/1984 | Torok et al. | 350/162.24 |
| 4,440,839 A | | 4/1984 | Mottier | 430/2 |
| 4,443,819 A | | 4/1984 | Funada et al. | 358/236 |
| 4,443,845 A | | 4/1984 | Hamilton et al. | 364/200 |
| 4,447,881 A | | 5/1984 | Brantingham et al. | 364/488 |
| 4,454,591 A | | 6/1984 | Lou | 364/900 |
| 4,456,338 A | | 6/1984 | Gelbart | 350/358 |
| 4,460,907 A | | 7/1984 | Nelson | 346/153.1 |
| 4,462,046 A | | 7/1984 | Spight | 358/101 |
| 4,467,342 A | | 8/1984 | Tower | 357/30 |
| 4,468,725 A | | 8/1984 | Venturini | 363/160 |
| 4,483,596 A | | 11/1984 | Marshall | 350/385 |
| 4,484,188 A | | 11/1984 | Ott | 340/728 |
| 4,487,677 A | | 12/1984 | Murphy | 204/247 |
| 4,492,435 A | | 1/1985 | Banton et al. | 350/360 |
| 4,503,494 A | | 3/1985 | Hamilton et al. | 364/200 |
| 4,511,220 A | | 4/1985 | Scully | 350/403 |
| 4,538,883 A | | 9/1985 | Sprague et al. | 350/356 |
| 4,545,610 A | | 10/1985 | Lakritz et al. | 29/589 |
| 4,556,378 A | | 12/1985 | Nyfeler et al. | 425/143 |
| 4,558,171 A | | 12/1985 | Gantley et al. | 174/52 FP |
| 4,561,011 A | | 12/1985 | Kohara et al. | |
| 4,561,044 A | | 12/1985 | Ogura et al. | 362/84 |
| 4,566,935 A | | 1/1986 | Hornbeck | 156/626 |
| 4,567,585 A | | 1/1986 | Gelbart | 369/97 |
| 4,571,041 A | | 2/1986 | Gaudyn | 353/10 |
| 4,571,603 A | | 2/1986 | Hornbeck et al. | 346/160 |
| 4,577,932 A | | 3/1986 | Gelbart | 350/358 |
| 4,577,933 A | | 3/1986 | Yip et al. | 350/358 |
| 4,588,957 A | | 5/1986 | Balant et al. | 330/4.3 |
| 4,590,548 A | | 5/1986 | Maytum | 363/161 |
| 4,594,501 A | | 6/1986 | Culley et al. | 219/492 |
| 4,596,992 A | | 6/1986 | Hornbeck | 346/76 PH |
| 4,615,595 A | | 10/1986 | Hornbeck | 353/122 |
| 4,623,219 A | | 11/1986 | Trias | 350/351 |
| 4,636,039 A | | 1/1987 | Turner | 350/356 |
| 4,636,866 A | | 1/1987 | Hattori | 358/236 |
| 4,641,193 A | | 2/1987 | Glenn | 358/233 |
| 4,645,881 A | | 2/1987 | LeToumelin et al. | 379/252 |
| 4,646,158 A | | 2/1987 | Ohno et al. | 358/236 |
| 4,649,085 A | | 3/1987 | Landram | 428/620 |
| 4,649,432 A | | 3/1987 | Watanabe et al. | 358/241 |
| 4,652,932 A | | 3/1987 | Miyajima et al. | 358/236 |
| 4,655,539 A | | 4/1987 | Caulfield et al. | 350/3.6 |
| 4,660,938 A | | 4/1987 | Kazan | 353/355 |
| 4,661,828 A | | 4/1987 | Miller, Jr. et al. | 346/108 |
| 4,662,746 A | | 5/1987 | Hornbeck | 350/269 |
| 4,663,670 A | | 5/1987 | Ito et al. | 358/245 |
| 4,687,326 A | | 8/1987 | Corby, Jr. | 356/5 |
| 4,698,602 A | | 10/1987 | Armitage | 332/7.51 |
| 4,700,276 A | | 10/1987 | Freyman et al. | 361/403 |
| 4,707,064 A | | 11/1987 | Dobrowolski et al. | 350/96.19 |
| 4,709,995 A | | 12/1987 | Kuribayashi et al. | 350/350 |

| Patent | Date | Inventor | Class |
|---|---|---|---|
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/1.1 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |

| | | | | | | |
|---|---|---|---|---|---|---|
| 5,162,787 A | 11/1992 | Thompson et al. ......... 340/794 | 5,258,325 A | 11/1993 | Spitzer et al. ................ 437/86 |
| 5,164,019 A | 11/1992 | Sinton ........................ 136/249 | 5,260,718 A | 11/1993 | Rommelmann et al. 346/107 R |
| 5,165,013 A | 11/1992 | Faris ........................... 395/104 | 5,260,798 A | 11/1993 | Um et al. .................... 358/233 |
| 5,168,401 A | 12/1992 | Endriz ....................... 359/625 | 5,262,000 A | 11/1993 | Welbourn et al. ........... 156/643 |
| 5,168,406 A | 12/1992 | Nelson ...................... 359/855 | 5,272,473 A | 12/1993 | Thompson et al. ............ 345/7 |
| 5,170,156 A | 12/1992 | DeMond et al. ............ 340/794 | 5,278,652 A | 1/1994 | Urbanus et al. ............. 358/160 |
| 5,170,269 A | 12/1992 | Lin et al. ....................... 359/9 | 5,278,925 A | 1/1994 | Boysel et al. ................. 385/14 |
| 5,170,283 A | 12/1992 | O'Brien et al. ............. 359/291 | 5,280,277 A | 1/1994 | Hornbeck ................... 345/108 |
| 5,172,161 A | 12/1992 | Nelson ...................... 355/200 | 5,281,887 A | 1/1994 | Engle ......................... 310/335 |
| 5,172,262 A | 12/1992 | Hornbeck ................... 359/223 | 5,281,957 A | 1/1994 | Schoolman ..................... 345/8 |
| 5,177,724 A | 1/1993 | Gelbart .................... 369/44.16 | 5,285,105 A | 2/1994 | Cain ......................... 257/672 |
| 5,178,728 A | 1/1993 | Boysel et al. ............... 156/656 | 5,285,196 A | 2/1994 | Gale, Jr. ..................... 345/108 |
| 5,179,274 A | 1/1993 | Sampsell ................ 250/208.2 | 5,285,407 A | 2/1994 | Gale et al. ............. 365/189.11 |
| 5,179,367 A | 1/1993 | Shimizu ..................... 340/700 | 5,287,096 A | 2/1994 | Thompson et al. ......... 345/147 |
| 5,181,231 A | 1/1993 | Parikh et al. ................. 377/26 | 5,287,215 A | 2/1994 | Warde et al. ................ 359/293 |
| 5,182,665 A | 1/1993 | O'Callaghan et al. ........ 359/95 | 5,289,172 A | 2/1994 | Gale, Jr. et al. ............. 345/108 |
| 5,185,660 A | 2/1993 | Um .............................. 358/60 | 5,291,317 A | 3/1994 | Newswanger ................ 359/15 |
| 5,185,823 A | 2/1993 | Kaku et al. | 5,291,473 A | 3/1994 | Pauli ......................... 369/112 |
| 5,188,280 A | 2/1993 | Nakao et al. ................ 228/123 | 5,293,511 A | 3/1994 | Poradish et al. ............. 257/434 |
| 5,189,404 A | 2/1993 | Masimo et al. ............. 340/720 | 5,296,408 A | 3/1994 | Wilbarg et al. ............. 437/203 |
| 5,189,505 A | 2/1993 | Bartelink .................... 257/419 | 5,296,891 A | 3/1994 | Vogt et al. .................... 355/67 |
| 5,191,405 A | 3/1993 | Tomita et al. ............... 257/777 | 5,296,950 A | 3/1994 | Lin et al. ....................... 359/9 |
| 5,192,864 A | 3/1993 | McEwen et al. ............ 250/234 | 5,298,460 A | 3/1994 | Nishiguchi et al. .......... 437/183 |
| 5,192,946 A | 3/1993 | Thompson et al. ......... 340/794 | 5,299,037 A | 3/1994 | Sakata ......................... 359/41 |
| 5,198,895 A | 3/1993 | Vick ........................... 358/103 | 5,299,289 A | 3/1994 | Omae et al. ................... 359/95 |
| D334,557 S | 4/1993 | Hunter et al. .............. D14/114 | 5,300,813 A | 4/1994 | Joshi et al. ................. 257/752 |
| D334,742 S | 4/1993 | Hunter et al. .............. D14/113 | 5,301,062 A | 4/1994 | Takahashi et al. ........... 359/567 |
| 5,202,785 A | 4/1993 | Nelson ....................... 359/214 | 5,303,043 A | 4/1994 | Glenn ......................... 348/40 |
| 5,206,629 A | 4/1993 | DeMond et al. ............ 340/719 | 5,303,055 A | 4/1994 | Hendrix et al. ............. 348/761 |
| 5,206,829 A | 4/1993 | Thakoor et al. | 5,307,056 A | 4/1994 | Urbanus ..................... 340/189 |
| 5,208,818 A | 5/1993 | Gelbart et al. ................ 372/30 | 5,307,185 A | 4/1994 | Jones et al. .................... 359/41 |
| 5,208,891 A | 5/1993 | Prysner ...................... 385/116 | 5,310,624 A | 5/1994 | Ehrlich ....................... 430/322 |
| 5,210,637 A | 5/1993 | Puzey ........................ 359/263 | 5,311,349 A | 5/1994 | Anderson et al. ........... 359/223 |
| 5,212,115 A | 5/1993 | Cho et al. ................... 437/208 | 5,311,360 A | 5/1994 | Bloom et al. ................ 359/572 |
| 5,212,555 A | 5/1993 | Stoltz ......................... 358/206 | 5,312,513 A | 5/1994 | Florence et al. ............. 156/643 |
| 5,212,582 A | 5/1993 | Nelson ....................... 359/224 | 5,313,479 A | 5/1994 | Florence ...................... 372/26 |
| 5,214,308 A | 5/1993 | Nishiguchi et al. ......... 257/694 | 5,313,648 A | 5/1994 | Ehlig et al. ................. 395/800 |
| 5,214,419 A | 5/1993 | DeMond et al. ............ 340/794 | 5,313,835 A | 5/1994 | Dunn ......................... 73/505 |
| 5,214,420 A | 5/1993 | Thompson et al. ......... 340/795 | 5,315,418 A | 5/1994 | Sprague et al. ............... 359/41 |
| 5,216,278 A | 6/1993 | Lin et al. | 5,315,423 A | 5/1994 | Hong ......................... 359/124 |
| 5,216,537 A | 6/1993 | Hornbeck ................... 359/291 | 5,315,429 A | 5/1994 | Abramov |
| 5,216,544 A | 6/1993 | Horikawa et al. .......... 359/622 | 5,319,214 A | 6/1994 | Gregory et al. ......... 250/504 R |
| 5,219,794 A | 6/1993 | Satoh et al. ................. 437/209 | 5,319,668 A | 6/1994 | Luecke ....................... 372/107 |
| 5,220,200 A | 6/1993 | Blanton ...................... 257/778 | 5,319,789 A | 6/1994 | Ehlig et al. ................. 395/800 |
| 5,221,400 A | 6/1993 | Staller et al. ................ 156/292 | 5,319,792 A | 6/1994 | Ehlig et al. ................. 395/800 |
| 5,221,982 A | 6/1993 | Faris ............................ 359/93 | 5,320,709 A | 6/1994 | Bowden et al. |
| 5,224,088 A | 6/1993 | Atiya ........................... 369/97 | 5,321,416 A | 6/1994 | Bassett et al. ................. 345/8 |
| D337,320 S | 7/1993 | Hunter et al. .............. D14/113 | 5,323,002 A | 6/1994 | Sampsell et al. ......... 250/252.1 |
| 5,226,099 A | 7/1993 | Mignardi et al. ............. 385/19 | 5,323,051 A | 6/1994 | Adams et al. ............... 257/417 |
| 5,229,597 A | 7/1993 | Fukatsu | 5,325,116 A | 6/1994 | Sampsell .................... 346/108 |
| 5,230,005 A | 7/1993 | Rubino et al. ............... 372/20 | 5,327,286 A | 7/1994 | Sampsell et al. ............ 359/561 |
| 5,231,363 A | 7/1993 | Sano et al. .................. 332/109 | 5,329,289 A | 7/1994 | Sakamoto et al. ........... 345/126 |
| 5,231,388 A | 7/1993 | Stoltz ......................... 340/783 | 5,330,301 A | 7/1994 | Brancher .................... 414/417 |
| 5,231,432 A | 7/1993 | Glenn ......................... 353/31 | 5,330,878 A | 7/1994 | Nelson ....................... 430/311 |
| 5,233,456 A | 8/1993 | Nelson ....................... 359/214 | 5,331,454 A | 7/1994 | Hornbeck ................... 359/224 |
| 5,233,460 A | 8/1993 | Partlo et al. ................ 359/247 | 5,334,991 A | 8/1994 | Wells et al. ................... 345/8 |
| 5,233,874 A | 8/1993 | Putty et al. ............. 73/517 AV | 5,339,116 A | 8/1994 | Urbanus et al. ............. 348/716 |
| 5,237,340 A | 8/1993 | Nelson ....................... 346/108 | 5,339,177 A | 8/1994 | Jenkins et al. ................ 359/35 |
| 5,237,435 A | 8/1993 | Kurematsu et al. ........... 359/41 | 5,340,772 A | 8/1994 | Rosotker .................... 437/226 |
| 5,239,448 A | 8/1993 | Perkins et al. .............. 361/764 | 5,345,521 A | 9/1994 | McDonald et al. ........... 385/19 |
| 5,239,806 A | 8/1993 | Maslakow .................... 53/432 | 5,347,321 A | 9/1994 | Gove ......................... 348/663 |
| 5,240,818 A | 8/1993 | Mignardi et al. ........... 430/321 | 5,347,378 A | 9/1994 | Handschy et al. ............ 359/53 |
| 5,245,686 A | 9/1993 | Faris et al. .................. 385/120 | 5,347,433 A | 9/1994 | Sedlmayr ..................... 362/32 |
| 5,247,180 A | 9/1993 | Mitcham et al. ......... 250/492.1 | 5,348,619 A | 9/1994 | Bohannon et al. .......... 156/664 |
| 5,247,593 A | 9/1993 | Lin et al. ...................... 385/17 | 5,349,687 A | 9/1994 | Ehlig et al. ................. 395/800 |
| 5,249,245 A | 9/1993 | Lebby et al. ................ 385/89 | 5,351,052 A | 9/1994 | D'Hont et al. ................ 342/42 |
| 5,251,057 A | 10/1993 | Guerin et al. ............... 359/249 | 5,352,926 A | 10/1994 | Andrews .................... 257/717 |
| 5,251,058 A | 10/1993 | MacArthur ................. 359/249 | 5,354,416 A | 10/1994 | Okudaira et al. ............ 156/643 |
| 5,254,980 A | 10/1993 | Hendrix et al. .............. 345/84 | 5,357,369 A | 10/1994 | Pilling et al. ............... 359/462 |
| 5,255,100 A | 10/1993 | Urbanus ..................... 358/231 | 5,357,803 A | 10/1994 | Lane ....................... 73/517 B |
| 5,256,869 A | 10/1993 | Lin et al. .................. 250/201.9 | 5,359,349 A | 10/1994 | Jambor et al. .............. 345/168 |

| Patent | Date | Inventor | Class |
|---|---|---|---|
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |
| 5,371,618 A | 12/1994 | Tai et al. | 359/53 |
| 5,377,705 A | 1/1995 | Smith, Jr. et al. | 134/95.3 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/239 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,526,834 A | 6/1996 | Mielnik et al. | 134/105 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |

| Patent No. | Date | Inventor | Class |
|---|---|---|---|
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A * | 11/1998 | Yariv | 385/16 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A * | 11/1998 | Komatsu et al. | 385/129 |
| 5,844,711 A | 12/1998 | Long, Jr. | |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 | 6/2001 | Suganuma | |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |

| | | | | | | |
|---|---|---|---|---|---|---|
| 6,268,952 B1 | 7/2001 | Godil et al. ............... 359/291 | EP | 0 627 644 A2 | 12/1994 |
| 6,271,145 B1 | 8/2001 | Toda ....................... 438/706 | EP | 0 627 850 A1 | 12/1994 |
| 6,271,808 B1 | 8/2001 | Corbin ........................ 345/7 | EP | 0 643 314 A2 | 3/1995 |
| 6,274,469 B1 | 8/2001 | Yu .......................... 438/592 | EP | 0 654 777 A1 | 5/1995 |
| 6,282,213 B1 | 8/2001 | Gutin et al. | EP | 0 658 868 A1 | 6/1995 |
| 6,286,231 B1 | 9/2001 | Bergman et al. ............. 34/410 | EP | 0 658 830 A1 | 12/1995 |
| 6,290,859 B1 | 9/2001 | Fleming et al. ............... 216/2 | EP | 0 689 078 A1 | 12/1995 |
| 6,290,864 B1 | 9/2001 | Patel et al. .................. 216/79 | EP | 0 801 319 A1 | 10/1997 |
| 6,300,148 B1 | 10/2001 | Birdsley et al. ............. 438/15 | EP | 0 304 263 A2 | 2/1998 |
| 6,303,986 B1 | 10/2001 | Shook ...................... 257/680 | EP | 0 322 714 A2 | 7/1998 |
| 6,310,018 B1 | 10/2001 | Behr et al. ................. 510/175 | EP | 0 851 492 A2 | 7/1998 |
| 6,313,901 B1 | 11/2001 | Cacharelis | EP | 1 003 071 A2 | 5/2000 |
| 6,323,984 B1 | 11/2001 | Trisnadi .................... 359/245 | EP | 1 014 143 A1 | 6/2000 |
| 6,327,071 B1 | 12/2001 | Kimura ..................... 359/291 | EP | 1 040 927 A2 | 10/2000 |
| 6,342,960 B1 | 1/2002 | McCullough .............. 359/124 | GB | 2 117 564 A | 10/1983 |
| 6,346,430 B1 | 2/2002 | Raj et al. | GB | 2 118 365 A | 10/1983 |
| 6,356,577 B1 | 3/2002 | Miller ....................... 372/107 | GB | 2 266 385 A | 10/1993 |
| 6,356,689 B1 | 3/2002 | Greywall ..................... 385/52 | GB | 2 296 152 A | 6/1996 |
| 6,359,333 B1 | 3/2002 | Wood et al. ................ 257/704 | GB | 2 319 424 A | 5/1998 |
| 6,384,959 B1 | 5/2002 | Furlani et al. .............. 359/291 | JP | 53-39068 | 4/1978 |
| 6,387,723 B1 | 5/2002 | Payne et al. .................. 438/48 | JP | 55-111151 | 8/1980 |
| 6,392,309 B1 | 5/2002 | Wataya et al. ............. 257/796 | JP | 57-31166 | 2/1982 |
| 6,396,789 B1 | 5/2002 | Guerra et al. .............. 369/112 | JP | 57-210638 | 12/1982 |
| 6,418,152 B1 | 7/2002 | Davis | JP | 60-49638 | 3/1985 |
| 6,421,179 B1 | 7/2002 | Gutin et al. ................ 359/572 | JP | 60-94756 | 5/1985 |
| 6,438,954 B1 | 8/2002 | Goetz et al. | JP | 60-250639 | 12/1985 |
| 6,445,502 B1 | 9/2002 | Islam et al. ................ 359/571 | JP | 61-142750 | 6/1986 |
| 6,452,260 B1 | 9/2002 | Corbin et al. .............. 257/686 | JP | 61-145838 | 7/1986 |
| 6,466,354 B1 | 10/2002 | Gudeman ................... 359/247 | JP | 63-234767 | 9/1988 |
| 6,479,811 B1 | 11/2002 | Kruschwitz et al. | JP | 63-305323 | 12/1988 |
| 6,480,634 B1 | 11/2002 | Corrigan ...................... 385/4 | JP | 1-155637 | 6/1989 |
| 6,497,490 B1 | 12/2002 | Miller ........................ 359/614 | JP | 40-1155637 | 6/1989 |
| 6,525,863 B1 | 2/2003 | Riza .......................... 359/290 | JP | 2219092 | 8/1990 |
| 6,563,974 B2 | 5/2003 | Riza ........................... 385/18 | JP | 4-333015 | 11/1992 |
| 6,565,222 B1 | 5/2003 | Ishii et al. .................. 359/883 | JP | 7-281161 | 10/1995 |
| 6,569,717 B1 | 5/2003 | Murade | JP | 3288369 | 3/2002 |
| 6,639,722 B2 * | 10/2003 | Amm et al. ................ 359/571 | WO | WO 90/13913 | 11/1990 |
| 2001/0019454 A1 | 9/2001 | Tadic-Galeb et al. ........ 359/649 | WO | WO 92/12506 | 7/1992 |
| 2002/0015230 A1 | 2/2002 | Pilossof et al. ............. 359/558 | WO | WO 93/02269 | 2/1993 |
| 2002/0021485 A1 | 2/2002 | Pilossof ..................... 359/295 | WO | WO 93/09472 | 5/1993 |
| 2002/0079432 A1 | 6/2002 | Lee et al. ................... 250/216 | WO | WO 93/18428 | 9/1993 |
| 2002/0105725 A1 | 8/2002 | Sweatt et al. ............... 359/566 | WO | WO 93/22694 | 11/1993 |
| 2002/0112746 A1 | 8/2002 | DeYoung et al. ............. 134/36 | WO | WO 94/09473 | 4/1994 |
| 2002/0131228 A1 | 9/2002 | Potter | WO | WO 94/29761 | 12/1994 |
| 2002/0131230 A1 | 9/2002 | Potter ......................... 361/277 | WO | WO 95/11473 | 4/1995 |
| 2002/0135708 A1 | 9/2002 | Murden et al. | WO | WO 96/02941 | 2/1996 |
| 2002/0176151 A1 | 11/2002 | Moon et al. | WO | WO 96/08031 | 3/1996 |
| 2002/0195418 A1 | 12/2002 | Kowarz et al. | WO | WO 96/41217 | 12/1996 |
| 2002/0196492 A1 * | 12/2002 | Trisnadi et al. ............. 359/124 | WO | WO 96/41224 | 12/1996 |
| 2003/0056078 A1 | 3/2003 | Johansson et al. | WO | WO 97/22033 | 6/1997 |
| | | | WO | WO 97/26569 | 7/1997 |
| | FOREIGN PATENT DOCUMENTS | | WO | WO 98/05935 | 2/1998 |
| DE | 197 23 618 A1 | 12/1997 | WO | WO 98/24240 | 6/1998 |
| DE | 197 51 716 A1 | 5/1998 | WO | WO 98/41893 | 9/1998 |
| DE | 198 46 532 C1 | 5/2000 | WO | WO 99/07146 | 2/1999 |
| EP | 0 089 044 A2 | 9/1983 | WO | WO 99/12208 | 3/1999 |
| EP | 0 261 901 A2 | 3/1988 | WO | WO 99/23520 | 5/1999 |
| EP | 0 314 437 A1 | 10/1988 | WO | WO 99/34484 | 7/1999 |
| EP | 0 306 308 A2 | 3/1989 | WO | WO 99/59335 | 11/1999 |
| EP | 0 627 644 A3 | 9/1990 | WO | WO 99/63388 | 12/1999 |
| EP | 0 417 039 A1 | 3/1991 | WO | WO 99/67671 | 12/1999 |
| EP | 0 423 513 A2 | 4/1991 | WO | WO 00/04718 | 1/2000 |
| EP | 0 436 738 A1 | 7/1991 | WO | WO 00/07225 | 2/2000 |
| EP | 0 458 316 A2 | 11/1991 | WO | WO 01/04674 A1 | 1/2001 |
| EP | 0 477 566 A2 | 4/1992 | WO | WO 01/006297 A3 | 1/2001 |
| EP | 0 488 326 A3 | 6/1992 | WO | WO 01/57581 A3 | 8/2001 |
| EP | 0 499 566 A2 | 8/1992 | WO | WO 02/025348 A3 | 3/2002 |
| EP | 0 528 646 A1 | 2/1993 | WO | WO 02/31575 A2 | 4/2002 |
| EP | 0 530 760 A2 | 3/1993 | WO | WO 02/058111 A2 | 7/2002 |
| EP | 0 550 189 A1 | 7/1993 | WO | WO 02/065184 A3 | 8/2002 |
| EP | 0 610 665 A1 | 8/1994 | WO | WO 02/073286 A2 | 9/2002 |

| | | |
|---|---|---|
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11(1990), pp. 69–78.

R. Gerhard–Multhaupt, "Light–Valve Technologies for High–Definition Television Projection Displays", Display vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The $7^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Fam et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hombeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997.pp. 377 of 379.

N. J. Frigo et al., "A Wavelength–Division Multiplexed Passive Optical Network with Cost–Shared Components", IEEE Photonics, Technology Letters, vol. 6, No. 11, Nov. 1994, pp. 1365 of 1367.

M. S. Goodman et al., "The LAMBDANET Multiwavelength Network: Architecture, Applications, and Demonstations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum–Tunable Laser, Aug. 2000, pp. 58–62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronics Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991, IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley Micro Tabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933–1935.

P. C. Kundu et al., "Reduction of Speckle Noise by Varying the Polarisation of Illuminating Beam" XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Recuction in Laser Projection Systems by Diffractive Optical Elements", XP–000754330, Applied Optics, Apr. 1, 1998, vol. 37, No. 40, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice, " Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the Loop Applications", *IEEE Protonics Technology Letters*, vol. 6, No. 9, Sep. 1994, pp. 1119–1121.

J.A. Walker et al., "Demonstration of a Gain Flattened Optical Amplifier with Micromechanical Equalizer Element", Lucent Technologies, pp. 13–14.

A. P. Payne et al., "Resonance Measurement of Stresses in Al/Si$_3$N$_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

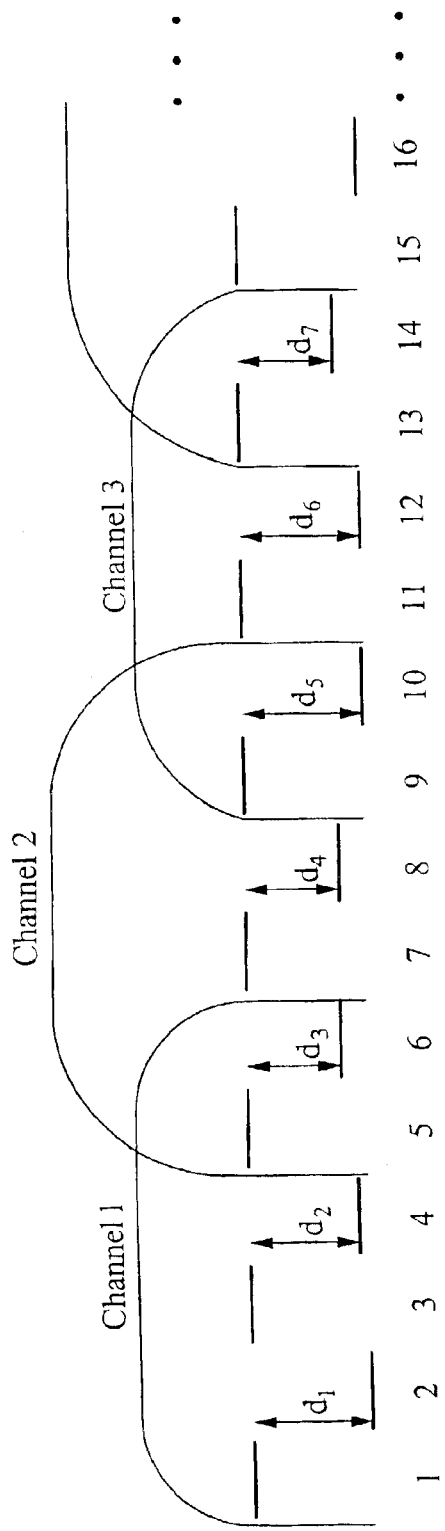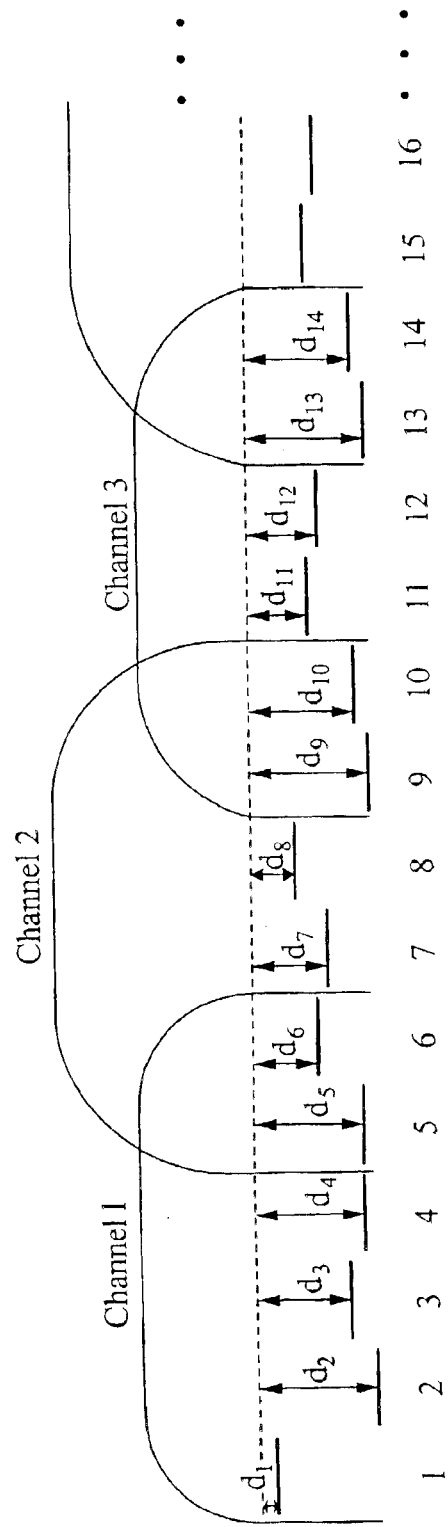

ARBITRARY PHASE PROFILE FOR BETTER EQUALIZATION IN DYNAMIC GAIN EQUALIZER

FIELD OF THE INVENTION

The present invention relates to an apparatus for improving equalization within a Dynamic Gain Equalizer (DGE). More particularly, this invention relates to an arbitrary phase profile for better equalization in a DGE.

BACKGROUND OF THE INVENTION

Designers and inventors have sought to develop a light modulator which can operate alone or together with other modulators. Such modulators should provide high operating speeds (KHz frame rates), a high contrast ratio or modulation depth, have optical flatness, be compatible with VLSI processing techniques, be easy to handle and be relatively low in cost. Two such related systems are found in U.S. Pat. Nos. 5,311,360 and 5,841,579 which are hereby incorporated by reference.

According to the teachings of the '360 and '579 patents, a diffractive light modulator is formed of a multiple mirrored-ribbon structure. An example of such a diffractive light modulator 10 is shown in FIG. 1. The diffractive light modulator 10 comprises elongated elements 12 suspended by first and second posts, 14 and 16, above a substrate 20. The substrate 20 comprises a conductor 18. In operation, the diffractive light modulator 10 operates to produce modulated light selected from a reflection mode and a diffraction mode.

FIGS. 2 and 3 illustrate a cross-section of the diffractive light modulator 10 in a reflection mode and a diffraction mode, respectively. The elongated elements 12 comprise a conducting and reflecting surface 22 and a resilient material 24. The substrate 20 comprises conductor 18.

FIG. 2 depicts the diffractive light modulator 10 in the reflection mode. In the reflection mode, the conducting and reflecting surfaces 22 of the elongated elements 12 form a plane so that incident light I reflects from, the elongated elements 12 to produce reflected light R.

FIG. 3 depicts the diffractive light modulator 10 in the diffraction mode. In the diffraction mode, an electrical bias causes alternate ones of the elongated elements 12 to move toward the substrate 20. The electrical bias is applied between the reflecting and conducting surfaces 22 of the alternate ones of the elongated elements 12 and the conductor 18. The electrical bias results in a height difference between the alternate ones of the elongated elements 12 and non-biased ones of the elongated elements 12. A height difference of a quarter wavelength $\lambda/4$ of the incident light I produces maximum diffracted light including plus one and minus one diffraction orders, $D_{+1}$ and $D_{-1}$.

FIGS. 2 and 3 depict the diffractive light modulator 10 in the reflection and diffraction modes, respectively. For a deflection of the alternate ones of the elongated elements 12 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements 12 less the quarter wavelength $\lambda/4$, the diffractive light modulator 10 produces a variable reflectivity.

In WDM (wavelength division multiplex) optical communication, multiple component wavelengths of light each carry a communication signal. Each of the multiple component wavelengths of light form a WDM channel. A dynamic gain equalizer (DGE) can he used for WDM signal management. A variety of dynamic equalization techniques have been advanced, which seek to equalize component signals in a WDM system. Most rely on some spectral multiplexer/de-multiplexer component, followed by an electrically-controllable variable optical attenuator which can operate on the de-multiplexed channels (or possibly a band of channels). Diffractive light modulators arc often used as the variable optical attenuator within a DGE. Each channel is directed to a corresponding portion of the diffractive light modulator. To maximize space, each channel partially overlaps an adjacent channel as the channels impinge the diffractive light modulator. Overlapping channels is useful to minimize the number of required ribbons. If channels are not overlapped, then the optical path has to be increased, which leads to a larger optical package.

What is needed is a method and apparatus for improving the accuracy of a DGE that utilizes overlapping channels. What is also needed is a method and apparatus for reducing the computational power required for DGE that utilizes overlapping channels.

SUMMARY OF THE INVENTION

An embodiment of the present invention includes a device for selectively adjusting power levels of component signals of a wavelength division multiplexed signal including a first wavelength signal and a second wavelength signal. The device includes a light modulator comprising a plurality of elements. The plurality of elements are configured to form an arbitrary phase profile. The plurality of elements includes a first group of elements configured to receive the first wavelength signal and a second group of elements configured to receive the second wavelength signal. The first group of elements and the second group of elements include at least one common element. Each element is controllable such that each group of elements directs a selected portion of a corresponding received wavelength signal in a first mode. Each first mode is collected such that a power level of each wavelength signal is selectively adjusted.

The plurality of elements can be arranged in parallel and each element can include a light reflective planar surface with the light reflective planar surfaces lying in one or more parallel planes. The first group of elements are in series with the second group of elements, where the common elements are the elements of the first and second groups of elements that are closest to each other. The light modulator can also include a support structure coupled to each end of the plurality of elements to maintain a position of each element relative to each other and to enable movement of each of the plurality of elements in a direction normal to the one or more parallel planes of the plurality of elements. Each element can also include a first conductive element and the light modulator can also include a substrate coupled to the support structure. The substrate can also include a second conductive element such that in operation an electric bias applied between the first conductive element and the second conductive element enables individually controlled movement of each of the plurality of elements. The light reflective planar surface can include the first conductive element. The arbitrary phase profile determines the portion of the received wavelength signal that is selectively directed in the first mode. A remaining portion of the received wavelength signal can be randomly scattered away from the first mode.

The first mode can be a reflection mode in which the plurality of elements are configured to reflect the selected portion of the received wavelength signal as a plane mirror. The first mode can also be a diffraction mode in which the plurality of elements are configured to diffract the selected portion of the received wavelength signal. The remaining portion can be randomly scattered by diffraction. The light modulator can be a diffractive light modulator. The diffractive light modulator can be a grating light valve type device.

BRIEF DESCRIPTION OF THE DRAWINGS

FIG. 4 illustrates overlapping channels impinging the diffractive light modulator that imparts a square well profile.

FIG. 5 illustrates overlapping channels impinging the diffractive light modulator that imparts an arbitrary phase profile.

DETAILED DESCRIPTION OF THE EMBODIMENTS

Figure 1:
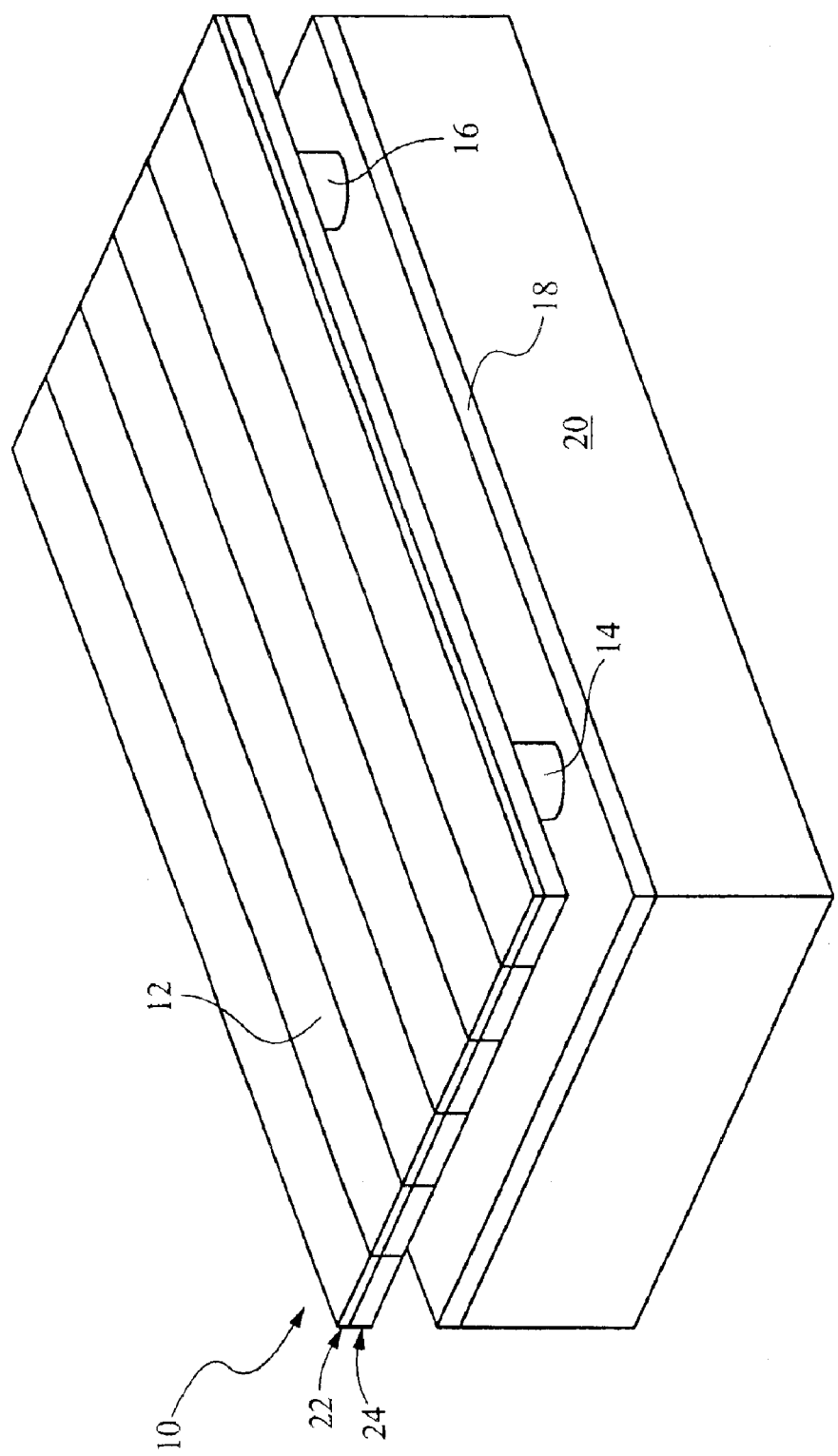
FIG. 1 illustrates an exemplary diffractive light modulator.
Figure 2:
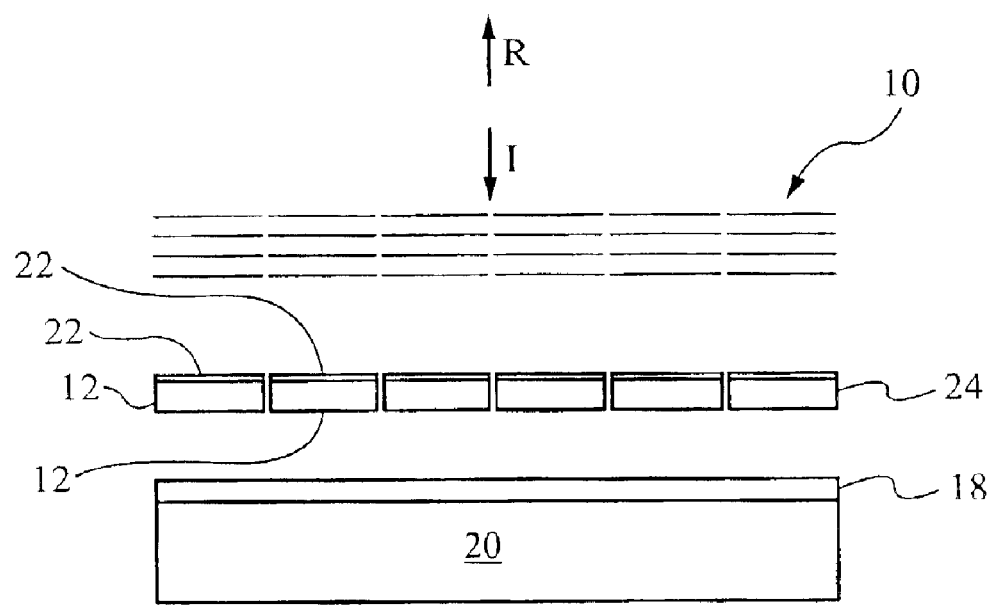
FIG. 2 illustrates a cross-section of the diffractive light modulator in a reflection mode.
Figure 3:
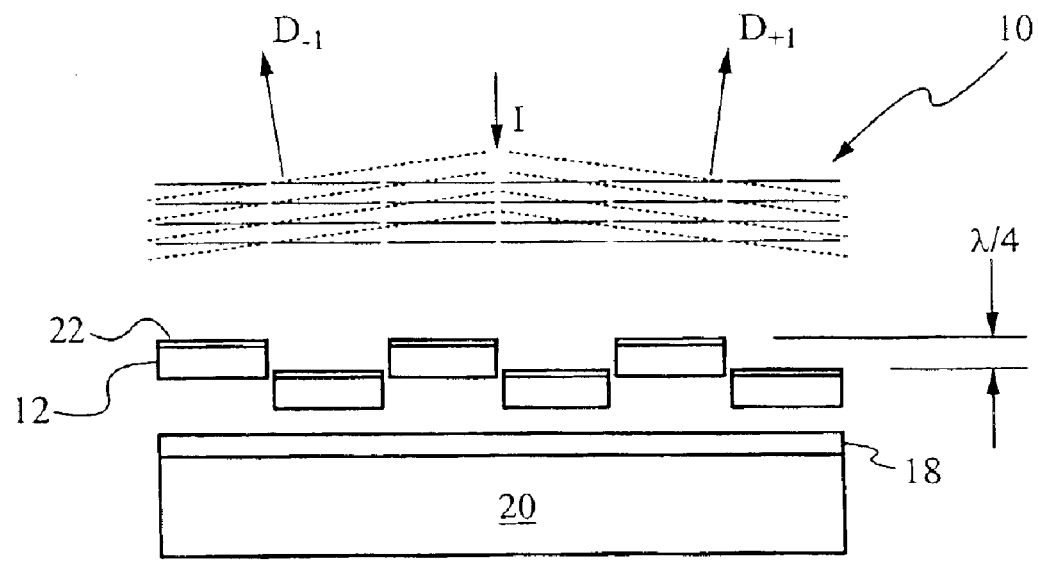
FIG. 3 illustrates a cross-section of the diffractive light modulator in a diffraction mode.

Preferably, the present invention relates to methods of equalizing channels within a multi-channel environment in which adjacent channels partially overlap. One method of equalizing utilizes a diffractive light modulator operating such that alternating elongated elements are active. Such an alternating pattern creates a square well grating where the depth of each well is determined by the amount of deflection of the corresponding active element. The remaining, non-active elements preferably lie in a plane that forms a planar top layer of the square well grating. Preferably, the diffractive light modulator is a grating light valve type device and the elongated elements are ribbons of the grating light valve type device. The amount that each ribbon is deflected can be considered as a variable for purposes of mathematically determining the necessary attenuation for each channel. In such a usage, only the variables corresponding to active ribbon deflections (i.e. half of the total number of ribbons in this first method) are available for achieving equalization.

It should be born in mind that terms like "equalize" and "equalization" as used with respect to the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies.

FIG. 4 illustrates a cross-sectional view of a first three channels impinging a grating light valve type device. The grating light valve type device in FIG. 4 operates according to the first method in which alternating ribbons are active. Preferably, each channel impinges six ribbons, three of which are active. It is understood that the number of ribbons corresponding to each channel can be more, or less, than six. Each channel partially overlaps an adjacent channel as the channels impinge the grating light valve type device. Overlapping channels is useful to minimize the number of required ribbons. If channels are not overlapped, then a longer optical path is required, which leads to a larger optical package. Preferably, the adjacent channels overlap such that they share two ribbons. As shown in FIG. 4, channel 1 impinges ribbons 1–6, channel 2 impinges ribbons 5–10, and channel 3 impinges ribbons 9–14. It is understood that more, or less, channels can impinge the grating light valve type device, each channel impinging a corresponding six ribbons. Channel 1 and channel 2 share ribbons 5 and 6, channel 2 and channel 3 share ribbons 9 and 10, and so on.

Ribbons 2, 4, 6, 8, 10, 12, 14, etc. are the alternating ribbons which are active. Each of the ribbons 2, 4, 6, 8, 10, 12, 14 can be individually moved by a distance d. Each active ribbon i can be moved a distance di. A phase profile of the grating light valve type device is that of a square well grating where di is varied. An incident light impinging the grating light valve type device can be attenuated by deflecting the active ribbons on which the incident light impinges. The amount of attenuation is determined by the distance that each active ribbon is moved, or deflected. Therefore, attenuation is a function of the deflection distance. Channel 1 impinges the active ribbons 2, 4, and 6. The ribbons 2, 4, and 6 can be deflected a distance d1, d2, and d3, respectively, as shown in FIG. 4. The distances d1, d2, and d3 shown in FIG. 4 are arbitrary and the actual values of d1, d2, and d3 are dependent on the amount that channel 1 is to be attenuated.

Each incoming channel can have a different intensity, I. In most cases, the intensity of each channel is different. For example, the intensity of channel 1, I(Ch 1), does not equal the intensity of channel 2, I(Ch 2). A portion of channel 1 and a portion of channel 2 are shared due to overlapping. As a result, a portion of channel 1 and a portion of channel 2 experience the same common attenuation resulting from the shared portion. This is illustrated in FIG. 4. Channels 1 and 2 share ribbons 5 and 6. Of the shared ribbons 5 and 6, ribbon 6 is active. Therefore, any attenuation attributed to the deflection of ribbon 6 applies equally to both channel 1 and channel 2. Since this shared portion impacts both channels, the shared portion can be best utilized for performing a macro attenuation of both channels. This leaves the remaining, non-shared portions of each channel to perform any fine-tuning, or micro attenuation, of the channel.

An output intensity for a given channel h is a factor of the distance di of each ribbon corresponding to channel h. In the first method, alternating ribbons are deflected and the remaining ribbons are fixed. In the preferred case where there are 6 ribbons per channel, 3 of the 6 ribbons are deflected, and the output intensity for channel h is a factor of the distance di for 3 ribbons. Essentially, there are 3 variables to equalize the output intensity of channel h.

In general, where channel h impinges n ribbons, the output intensity for channel h, OI(Ch h) is a function of di where i=1 to n/2. In other words, there are n/2 variables that can be used to determine the output intensity, OI(Ch h). The equalization process is controlled by n/2 variables.

Further, since channels are overlapping on the grating light valve type device, the number of variables that can be used to independently control the output intensity for a specific channel is further reduced. For example, in the 6 ribbon per channel case above, only 3 of the ribbons are movable, which constitutes 3 variables. However, 2 ribbons are shared with each adjacent channel, which means 4 of the 6 ribbons for each channel are shared (this is not the case for each of the end channels, channel 1 and channel n, because each of the end channels only has one adjacent channel). Of these 4 ribbons, 2 ribbons are movable, which constitutes 2 variables. This reduces the number of independent variables for each channel from 3 to 1.

The output intensity for each channel can be expressed as a system of equations. The system of equations includes the variables corresponding to the deflection distances of each of the movable ribbons for that channel. The output intensity for channel 1 can be expressed as:

$$Ch. 1: OI(Ch\ 1) = a \cdot f(d1) + b \cdot f(d2) + c \cdot f(d3) \quad (1)$$

where f(d1) represents the output intensity corresponding to ribbons 1 and 2 and is a function of the distance d1, f(d2) represents the output intensity corresponding to ribbons 3 and 4 and is a function of the distance d2, and f(d3) represents the output intensity corresponding to ribbons 5 and 6 and is a function of the distance d3. Similarly, the output intensities for channels 2 and 3 can be expressed as:

$$Ch2: OI(Ch\ 2) = c' \cdot f(d3) + d' \cdot f(d4) + e' \cdot f(d5) \quad (2)$$

$$Ch3: OI(Ch\ 3) = e'' \cdot f(d5) + f'' \cdot f(d6) + g'' \cdot f(d7). \quad (3)$$

Additional channels can be similarly expressed, each equation including three variables in the case of the first method. As can be seen from the equations 1 and 2, the output intensities of channels 1 and 2 include a common element, f(d3). Channels 1 and 2 constrain each other because of the common element f(d3). As can be seen from equations 2 and 3, the output intensities of channels 2 and 3 include a common portion, f(d5). Channels 2 and 3 constrain each other because of the common element f(d5). The system of equations can be expanded to the general case where there are x total ribbons within the grating light valve type device. In this generalized case of the first method, there are x/2 total variables to be solved by the system of equations. Because these equations are interdependent, they must be solved simultaneously. They can not be solved independently.

The system of equation are solved iteratively by an equalization algorithm, so they are said to converge. With iterative problem solving, there is error. Therefore, for any number of iterations there is an associated error. Reducing the error is advantageous to better equalize the channels to a specific level. However, there is a cost to reducing the error. To reduce the error, more iterations are required. Each iteration requires computational power to perform. Therefore, to reduce the error requires additional computational power. Typically, a finite amount of computational power is allocated to solve each system of equations. At times, the allocated computational power is not sufficient to reduce the error below an acceptable threshold. In these cases, the system of equations is said to be unsolvable.

The present invention provides another, and preferred, method that increases the number of variables. This provides more degrees of freedom to solve the same system of equations. The number of variables is increased by utilizing a diffractive light modulator operating such that each elongated element is active. Preferably, the diffractive light modulator is a grating light valve type device and the elongated elements are ribbons of the grating light valve type device. By enabling all ribbons to be active, this creates an arbitrary phase profile as opposed to the square well profile of the first method. The arbitrary phase profile is dictated by the system of equations, but the system of equations now has more variables. Where channel h impinges n ribbons, there are n variables. This provides twice the degree of freedom as compared to the first method where only alternating ribbons are active. This allows for better convergence characteristics of the equalization algorithm, e.g. lower ripple and/or faster convergence time.

FIG. 5 illustrates a cross-sectional view of a first three channels impinging a grating light valve type device. The grating light valve type device in FIG. 5 operates according to the second method in which each ribbon is active. The channels in FIG. 5 impinge the grating light valve type device the same as the channels in FIG. 4. Preferably, each channel impinges six ribbons, all six of which are active. It is understood that the number of ribbons corresponding to each channel can be more, or less, than six.

Each of the ribbons can be individually moved by a distance d. Each active ribbon i can be moved a distance di. A phase profile of the grating light valve type device is that of an arbitrary phase profile where di is varied. Channel 1 impinges the ribbons 1–6. The ribbons 1–6 can be deflected a distance d1–d6, respectively, as shown in FIG. 5. The distances d1–d6 shown in FIG. 5 are arbitrary and the actual values of d1–d6 are dependent on the amount that channel 1 is to be attenuated.

A portion of channel 1 and a portion of channel 2 are shared due to overlapping. As a result, a portion of channel 1 and a portion of channel 2 experience the same common attenuation resulting from the shared portion. This is illustrated in FIG. 5. Channels 1 and 2 share ribbons 5 and 6. Therefore, any attenuation attributed to the deflection of ribbon 5 and 6 applies equally to both channel 1 and channel 2. In this second method, 2 active ribbons are shared by each pair of adjacent channels, as opposed to the single active ribbon that is shared in the first method. This improves the degree of freedom in applying the macro attenuation to the channels 1 and 2.

In the preferred case where there are 6 ribbons per channel, all 6 ribbons are deflected in the preferred method, and the output intensity for channel h is a factor of the distance di for 6 ribbons. Essentially, there arc 6 variables to equalize the output intensity of channel h.

In general, where channel h impinges n ribbons, the output intensity for channel h, OI(Ch h), is a function of di where i=1 to n. In other words, there are n variables that can be used to determine an output intensity, OI(Ch h). The equalization process is controlled by n variables in the second method as opposed to n/2 variables as in the first method.

The output intensity for each channel can again be expressed as a system of equations. The system of equations includes the variables corresponding to the deflection distances of each of the movable ribbons for that channel. The output intensity for channel 1 can be expressed as:

$$OI(CH\ 1) = a \cdot f(d1) + b \cdot f(d2) + c \cdot f(d3) + d \cdot f(d4) + e \cdot f(d5) + f \cdot f(d6) \quad (4)$$

where f(d1) represents the output intensity corresponding to ribbon 1 and is a function of the distance d1, f(d2) represents the output intensity corresponding to ribbon 2 and is a function of the distance d2, f(d3) represents the output intensity corresponding to ribbon 3 and is a function of the distance d3, f(d4) represents the output intensity corresponding to ribbon 4 and is a function of the distance d4, f(d5) represents the output intensity corresponding to ribbon 5 and is a function of the distance d5, and f(d6) represents the output intensity corresponding to ribbon 6 and is a function of the distance d6. Similarly, the output intensity for channel 2 can be expressed as:

$$OI(Ch\ 2) = e' \cdot f(d5) + f' \cdot f(d6) + g' \cdot f(d7) + h' \cdot f(d8) + i' \cdot f(d9) + j' \cdot f(d10). \quad (5)$$

Additional channels can be similarly expressed, each equation including six variables in the case of the second method. As can be seen from the equations 4 and 5, the output intensities of channels 1 and 2 include common elements f(d5) and f(d6). Channels 1 and 2 constrain each other because of the common elements f(d5) and f(d6). The system of equations can be expanded to the general case where there are x total ribbons within the grating light valve type device. In this generalized case of the first method, there are x total variables to be solved by the system of equations. Because these equations are interdependent, they must be solved simultaneously. They can not be solved independently.

Figure 6:
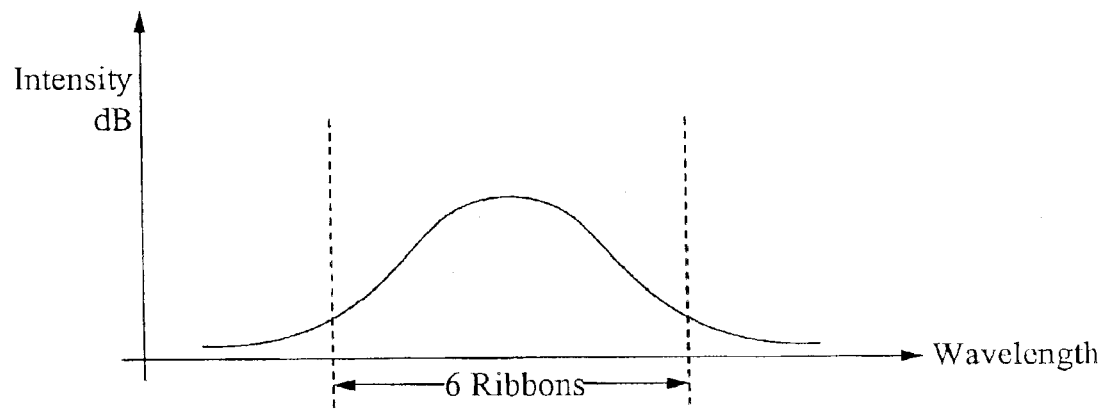
FIG. 6 illustrates an exemplary energy profile for a given channel.

Although each channel impinges 6 ribbons, the intensity of the incoming channel is not evenly distributed across each of the 6 ribbons. An exemplary energy distribution of an incoming channel is illustrated in FIG. 6. The energy distribution is typically a gaussian distribution including a maxima and trailing edges. As can be seen in FIG. 6, it is preferable that the energy of a single channel is not entirely directed onto the ribbons corresponding to that channel. The trailing edges of the energy distribution "leak" into the adjacent channel on either side. It is understood that the energy distribution illustrated in FIG. 6 can be a different function, or shape. It is also understood that the amount of the trailing edges that leaks onto adjacent channels can be more, or less, than that illustrated in FIG. 6.

Figure 7:
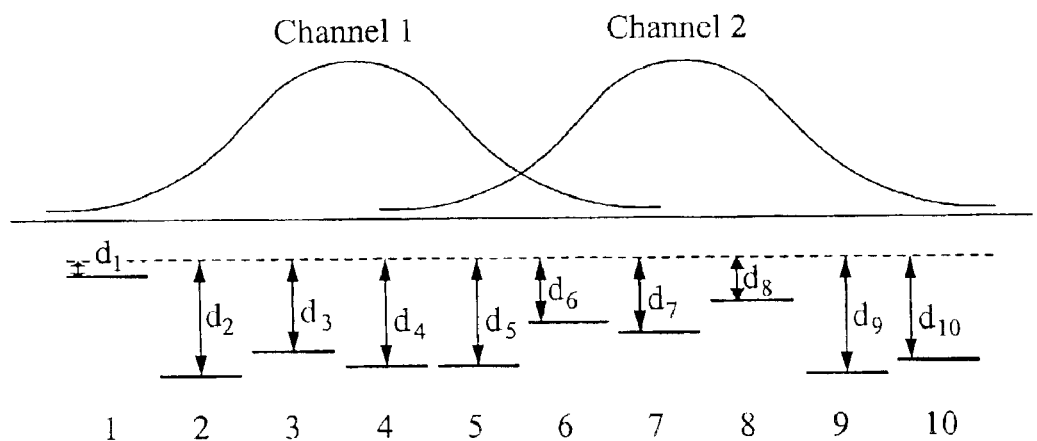
FIG. 7 illustrates the diffractive light modulator imparting an arbitrary phase profile for two overlapping channels and the corresponding energy profiles of the two channels.

FIG. 7 illustrates the cross-sectional view of the channels 1 and 2 impinging the grating light valve type device as in FIG. 5 where the channels 1 and 2 are represented by their energy distributions, as in FIG. 6. Consider the energy peak for each of the channels 1 and 2 and the relation of each of the peaks to the corresponding ribbons. For channel 1, the deflection distance of ribbon 3, d3, and ribbon 4, d4, are more influential in determining the output intensity of channel 1, OI(Ch 1), than the deflection distance of ribbon 2, d2, and ribbon 5, d5. This is because the peak of the incoming channel energy is directed onto ribbons 3 and 4. Similarly, d2 and d5 are more influential in determining OI(Ch 1) than the deflection distance of ribbon 1, d1, and ribbon 6, d6. Therefore, in regards to channel 1, d5 is more strongly coupled to d4 than d6 is to d4. For channel 2, the peak of the energy distribution is directed onto ribbons 7 and 8. Therefore, the deflection distance of ribbon 7, d7, and ribbon 8, d8, are more influential in determining OI(Ch 2) than are the deflection distances of ribbon 6, d6, and ribbon 9,d9. Similarly, d6 and d9 are more influential in determining OI(Ch 2) than d5 and the deflection distance of the ribbon 10, d10. Therefore, in regards to channel 2, d6 is more strongly coupled to d7 than d5 is to d7. Recall that ribbons 5 and 6 are both shared by channels 1 and 2, and therefore d5 and d6 each impact OI(Ch 1) and OI(Ch 2). However, since d5 is more strongly coupled to d4 and d6 is more strongly coupled to d7, d5 can be set to better follow the requirements of channel 1 and d6 can be set to better follow the requirements of channel 2. This further increases the degree of freedom in solving the system of equations for OI(Ch 1) and OI(Ch 2).

It is understood that the orientation by which the channels 1 and 2 impinge the grating light valve type device can be different than that illustrated in FIG. 7. For example, the energy distributions for channel 1 and/or channel 2 can be shifted to the right or to the left. It is further understood that the shape of the energy distribution curve of channel 1 and channel 2 can be different than that illustrated in FIG. 7.

As with the first method, the system of equations associated with the second method are solved iteratively. It is expensive to compute the system of equations and therefore determine the value of each deflection distance di. Expensive in this case refers to computing power. By doubling the number of variables to n, more variations are available to hasten the convergence of the equations. The number of iterations needed is determined by the acceptable error tolerance. With a fixed number of variables, the more iterations that are performed means the more computational power is required. However, by increasing the number of variables, as in the second method, the impact of each iteration is greater. Although each iteration requires more computational power because of the increased number of variables, the increased impact of each iteration is greater than the increased computational power necessary to perform each iteration. As a result, there is a net improvement using the second method by increasing the number of variables. This improvement can be used to decrease the number of iterations required to reach the same error tolerance, which reduces the necessary computational power. Or, for the same number of iterations, the size of the error can be reduced. A combination of decreasing computational power and reducing the error can also by used. This improvement also enables some previously unsolvable systems of equations to be solved by reducing the error to within acceptable error tolerances.

In summary, for the same error, it takes fewer iterations. For the same number of iterations, the error is reduced. By deflecting each ribbon, the ability to achieve specified levels of equalization are improved and/or the computational power requirements are reduced. The specific values of di are determined by the specific error tolerance required.

The preferred light modulator of the present invention preferably utilizes the second method to create an arbitrary phase profile that essentially forms a "rough surface." The rough surface causes the incident light to scatter. Preferably, the light modulator is used within a DGE in which a normal incident light is diffracted and the zero order light is collected while the attenuated light is scattered. Alternatively, the light modulator can be configured to receive an incident light off-axis to normal. In this case, there is still zero order light, but it is reflected at an angle.

Although the methods and apparatus of the present invention are intended to be used with overlapping channels, the present invention can also be used as a variable scatterer to attenuate a channel that is not overlapping.

It will be readily apparent to one skilled in the art that other various modifications may be made to the embodiments without departing from the spirit and scope of the invention as defined by the appended claims.

What is claimed is:

1. A device for selectively adjusting power levels of component signals of a wavelength division multiplexed signal including a first wavelength signal and a second wavelength signal, the device comprising a light modulator including a plurality of elements, the plurality of elements including a first group of elements configured to receive the first wavelength signal and a second group of elements configured to receive the second wavelength signal, wherein the first group of elements and the second group of elements include at least one common element which receives an overlapped portion of the first and second wavelength signals, further wherein the plurality of elements are controllably deflected such that each group of elements directs a selected portion of a corresponding received wavelength signal in a first mode, and further wherein the first mode is collected such that a power level of each wavelength signal is selectively adjusted.

2. The device according to claim 1 wherein the plurality of elements are arranged in parallel and each element includes a light reflective planar surface with the light reflective planar surfaces lying in one or more parallel planes.

3. The device according to claim 2 wherein the first group of elements are in series with the second group of elements, further wherein the common elements are the elements of the first and second groups of elements that are closest to each other.

4. The device according to claim 3 wherein the light modulator further comprises a support structure coupled to each end of the plurality of elements to maintain a position of each element relative to each other and to enable movement of each of the plurality of elements in a direction normal to the one or more parallel planes of the plurality of elements.

5. The device according to claim 4 wherein each element further comprises a first conductive element and the light modulator further comprises a substrate coupled to the support structure, the substrate comprising a second conductive element such that in operation an electric bias applied between the first conductive element and the second conductive element enables selective actuation of each of the plurality of elements.

6. The device to claim 5 wherein the light reflective planar surface comprises the first conductive element.

7. The device according to claim 1 wherein the plurality of elements are configured to form an arbitrary phase profile.

8. The device according to claim 7 wherein the arbitrary phase profile determines the portion of the received wavelength signal that is selectively directed into the first mode.

9. The device according to claim 8 wherein a remaining portion of the received wavelength signal is randomly scattered away from the first mode.

10. The device according to claim 1 wherein the first mode is a reflection mode in which the plurality of elements are configured to reflect the selected portion of the received wavelength signal as a plane mirror.

11. The device according to claim 1 wherein the first mode is a diffraction mode in which the plurality of elements are configured to diffract the selected portion of the received wavelength signal.

12. The device according to claim 9 wherein the remaining portion is randomly scattered by diffraction.

13. The device according to claim 1 wherein the light modulator comprises a diffractive light modulator.

14. A method for selectively adjusting power levels of component signals of a wavelength division multiplexed signal including a first wavelength signal and a second wavelength signal, the method comprising:

a. directing the component signals onto a plurality of elements, the plurality of elements including a first group of elements configured to receive the first wavelength signal and a second group of elements configured to receive the second wavelength signal, wherein the first group of elements and the second group of elements include at least one common element which receives an overlap portion of the first and second wavelength signals; and b. configuring each group of elements into an arbitrary phase profile by selectively actuating each element within each group such that each group directs a selected portion of a received wavelength signal in a first mode.

15. The method according to claim 14 further comprising collecting light directed in the first mode from each group such that a power level of each wavelength signal is selectively adjusted.

16. The method according to claim 14 wherein when the selected portion of the received wavelength signal is directed in the first mode, a remaining portion of the received wavelength signal is randomly scattered out of the first mode.

17. The method according to claim 14 wherein the plurality of elements are arranged in parallel and the first group of elements are in series with the second group of elements, further wherein the common elements are the elements of the first and the second groups of elements that are closest to each other.

18. The method according to claim 14 wherein the first mode is a reflection mode in which the plurality of elements are configured to reflect the selected portion of the received wavelength signal as a plane mirror.

19. A device for selectively adjusting power levels of component signals of a wavelength division multiplexed signal including a first wavelength signal and a second wavelength signal, the device comprising:

a. means for directing the component signals onto a plurality of elements, the plurality of elements including a first group of elements configured to receive the first wavelength signal and a second group of elements configured to receive the second wavelength signal, the first group of elements and the second group of elements including at least one common element which receives an overlap portion of the first and second wavelength signals; and b. means for configuring each group of elements to form an arbitrary phase profile that directs a selected portion of a received wavelength signal in a first mode and that randomly scatters a remaining portion of the received wavelength signal away from the first mode.

* * * * *